United States Patent [19]

Johnson, Jr. et al.

[11] 4,102,286
[45] Jul. 25, 1978

[54] METHOD OF MAKING LOUVERED CONNECTORS AND CONTACT ELEMENTS THEREOF

[75] Inventors: Glenn W. Johnson, Jr., Summit; Paul F. Lindlau, East Orange, both of N.J.

[73] Assignee: Amerace Corporation, New York, N.Y.

[21] Appl. No.: 798,898

[22] Filed: May 20, 1977

Related U.S. Application Data

[60] Division of Ser. No. 683,527, May 5, 1976, Pat. No. 4,039,238, which is a continuation of Ser. No. 503,783, Sep. 6, 1974, abandoned.

[51] Int. Cl.² .............................................. B21D 53/00
[52] U.S. Cl. ................................. 113/119; 29/630 R
[58] Field of Search ......... 113/119; 29/630 R, 630 C; 339/74 R, 95 R, 95 A, 95 D, 252, 253, 254, 256, 258, 262

[56] References Cited

U.S. PATENT DOCUMENTS

| 3,453,587 | 7/1969 | Neidecker | 339/256 RT |
| 3,861,595 | 2/1975 | Deal | 339/95 R |
| 3,861,776 | 1/1975 | Deal | 339/74 R |

Primary Examiner—Leon Gilden
Attorney, Agent, or Firm—S. Michael Bender

[57] ABSTRACT

Connectors having strip member contact elements wherein louvers or contact fingers extend in dissimilar extents from opposed sides of the strip member. Method is also disclosed for enhancing contact surface area between the extremities of contact fingers and complementary contact surfaces.

3 Claims, 10 Drawing Figures

METHOD OF MAKING LOUVERED CONNECTORS AND CONTACT ELEMENTS THEREOF

This is a division of application Ser. No. 683,527, filed 5/5/76 now U.S. Pat. No. 4,039,238 which is a continuation of Ser. No. 503,783, filed 9/6/74, now abandoned.

FIELD OF THE INVENTION

This invention relates generally to electrical connectors and contacts thereof and more particularly to electrical contacts of the type having resilient contact fingers for resiliently engaging a complementary contact surface.

BACKGROUND OF THE INVENTION

Known connectors with contacts having contact fingers in resilient engagement with a complementary contact surface, socalled "louvered connectors", such as are illustrated in Neidecker U.S. Pat. Nos. 3,453,587 and Crabbs 2,217,473, typically comprise elongate conductive strip members having a plurality of longitudinally spaced transverse openings defining longitudinally and transversely extending expanses therebetween which are bent or twisted with respect to the strip member so as to define contact fingers having opposed extremities displaced from respective opposite surfaces of the strip member. It is common to deploy these contacts by having the strip member ends disposed in a juxtaposed manner so as to provide a contact element having a substantially circular interior into which a male contact in the form of a pin member is insertable. The pin member diameter being greater than the diameter of the locus of the radially interior extremities of the contact fingers, the contact fingers are resiliently flexed upon pin member insertion and resiliently engage the same under sufficient contact pressure to provide electrical contact therewith. The strip member finger extremities extending radially exteriorly of the strip member engage the walls of a socket seating the contact element whereby an electrical path capable of transferring currents of relatively high magnitudes is provided between the pin member and the socket.

Performance considerations of presently known connectors and contacts of this type are several in number. Secure engagement of course need be provided between the separable connector parts, i.e., the pin member and the radially interiorly extending contact finger parts. This consideration necessitates careful control of manufacturing tolerances as between pin member diameter and contact element interior diameter, directly affecting manufacturing costs. Secondly, the resistance of the electrical connector to current flow therethrough is dependent to a large degree on surface contact area as between the contact fingers and both the pin member and the socket, engagement of the radially interior contact finger extremities and pin member being most significant since they are repeatedly separable in connector use. Reliability of this type of connector is also dependent on the cooperation of the contact element and the socket such that the former is not readily removable from the latter, giving rise to manufacturing tolerance control respecting the socket recess provided for containment of the contact element.

Known connectors of this type are not considered to readily exhibit the foregoing performance characteristics to the degree desired. Thus, unduly close manufacturing tolerances are demanded by existing connector structures of this type. Surface area engagement of the separable surfaces is regarded as less than adequate for certain applications in which particularly low connector electrical resistance is desired. Finally, in the absence of structure, additional to the electrically functioning parts of the contact element and socket themselves, for securely seating the contact element in the socket, the contact element has been observed to be separable from the socket upon manipulation of the pin member.

SUMMARY OF THE INVENTION

It is an object of the present invention to provide improved connectors of the subject type, exhibiting improvements over presently-known louvered connectors in each of the performance considerations discussed above.

In attaining the foregoing and other objects, the present invention provides, in its particularly preferred embodiment, louvered connector structure wherein contact fingers extend outwardly from an elongate strip member in opposed parts having respectively dissimilar longitudinal extents, thereby providing lessened spring rate for the contact finger part engaging the pin member and serving to reduce manufacturing tolerances on the parts of the connector. Such arrangement also provides for a deeper seating of the contact element in the socket recess and improves contact element retention. The invention further contemplates contact finger edge geometry serving to improve electrical engagement between the separable parts of such connectors by increasing the contact area afforded by the contact fingers.

The foregoing and other objects and features of the invention will be evident from the following detailed description of preferred embodiments thereof as illustrated in the drawings wherein like reference numerals identify like parts throughout.

DESCRIPTION OF THE PREFERRED EMBODIMENTS

Figure 1:
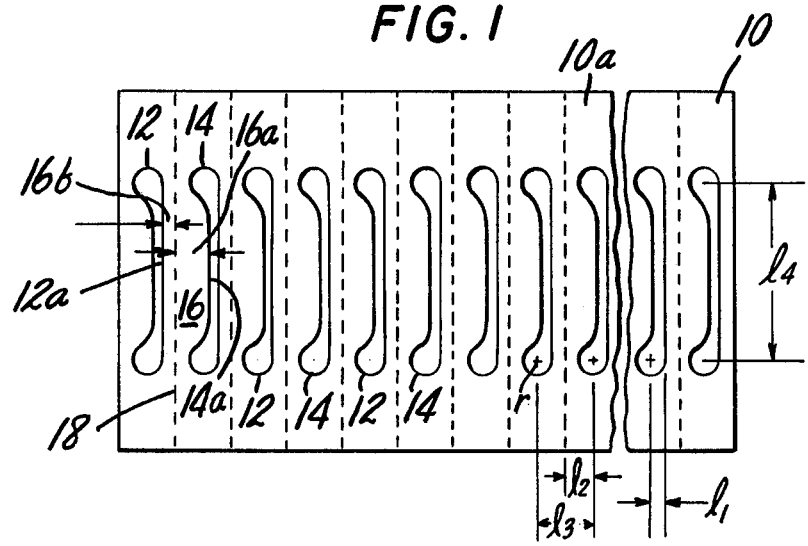
FIG. 1 is a plan view of an apertured strip member before expanses between adjacent openings therein are displaced outwardly of the openings to define contact fingers.
Figure 2:
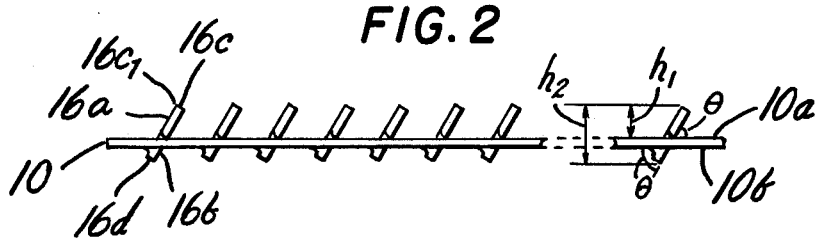
FIG. 2 is a side elevational view of the strip member of FIG. 1 after expanses between adjacent openings therein are displaced outwardly of the openings to define contact fingers.

Referring to FIGS. 1 and 2, elongate strip member 10 is comprised of electrically conductive material and includes a series of longitudinally spaced transverse openings 12, 14 extending through opposed first and second surfaces 10a and 10b. Considering the leftwardmost pair of openings, the strip member defines a continuous longitudinally and transversely extending expanse 16 therebetween, bordered by respectively adjacent transverse edges or boundaries 12a and 14a of these openings. Expanse 16 is disposed or displaced angularly outwardly of these openings, such as by twisting, about a transverse axis, e.g., axis 18, which axis is located longitudinally closer to one of such edges than it is to the other thereof. In the case of axis 18, which is longitudinally closer to edge 12a than to edge 14a, a first part 16a of expanse 16 is disposed, as shown in FIG. 2, at an acute angle $\theta$ relative to strip member surface 10a and a second part 16b of expanse 16 is disposed at an acute angle $\theta$ relative to strip member surface 10b, with first part 16a being of greater longitudinal extent than second part 16b. Upon such twisting of expanse 16, the same defines a contact finger or louver.

Figure 3:
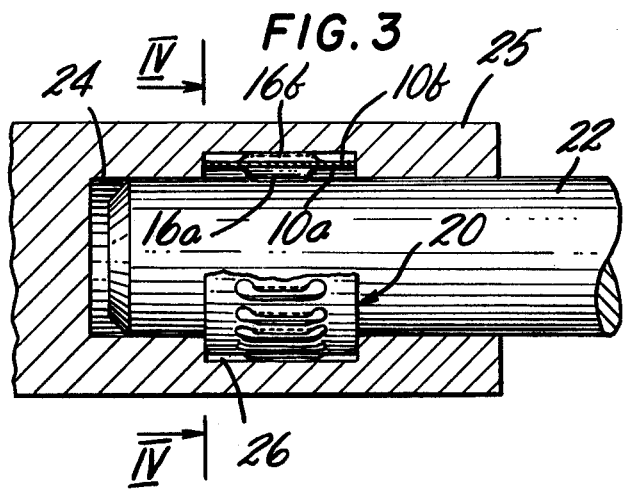
FIG. 3 is a side elevational view, partly in section and partly broken away to show detail, of a connector employing the strip member of FIG. 2 as a contact between a pin member and a socket.
Figure 4A:
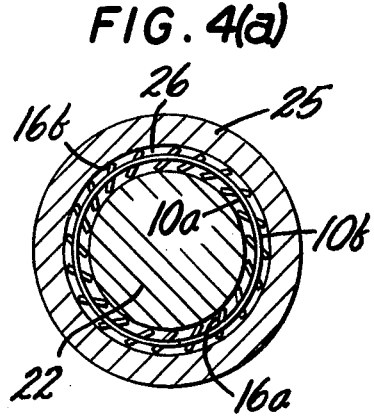
FIG. 4(a) is a sectional view as seen from the plane IV—IV of FIG. 3.

So prepared, the strip member then is formed into a cylindrical or ring-like shape with contact finger parts 16a extending radially inward of such cylinder and contact finger parts 16b extending radially outward of the cylinder, as shown in FIGS. 3 and 4(a). This arrangement provides a female contact element 20 which, when seated in socket 24 of housing 25, as depicted in FIG. 3, resiliently engages the encircling housing wall through extremities 16d of finger parts 16b, and is adapted for receiving a male contact element in the form of a cylindrically-shaped pin member 22, which latter will be resiliently engaged by sharp contact edges 16c₁ of each of extremities 16c of finger parts 16a. A recess 26 is provided in socket 24 for seating contact element 20 and retaining it against withdrawal. The housing socket diameter is slightly greater than the pin member outer diameter, with the latter greater than the locus of extremities 16c of the contact fingers when the pin member is not receivably engaged within the female contact element 20 in housing socket 24. The contact fingers accordingly provide electrical connection between the pin member and the housing when the pin member is received within the housing socket substantially as shown in FIGS. 3 and 4(a).

Various advantages attend the asymmetrical longitudinal relation existing among the twist axis and the respectively adjacent edges of successive strip member openings. In one aspect, the radially interior contact finger parts 16a encompass a major extent of the combined parts 16a and 16b of the contact fingers. Parts 16a thus constitute radially interior spring elements of greater longitudinal extent than those of the above-referenced known louvered connectors, which are derived from twisting of the strip member expanse about a transverse axis symmetrically disposed relative to respectively adjacent transverse edges of successive strip member openings. Since spring rate, i.e., the ratio of load to spring deflection, is inversely proportional to spring longitudinal extent, this geometry of the invention provides for lower spring rate for the interior contact finger parts than in known louvered connectors (the spring material, its thickness and its width being the same). As a result, it has been found that resilient engagement of contact fingers of connectors constructed in accordance with the invention providing desired electrical contact occurs for pin members varying over a greater range in diameter than is the case for otherwise like prior louvered connectors. Manufacturing tolerances as between the locus of the extremities of interior contact finger parts and pin diameter is thereby relaxed, giving rise to lowered costs in manufacture.

Apart from this advantage attending increased longitudinal extent of radially interior contact finger parts, further advantage attends the consequent reduction in length of radially exterior contact finger parts. With part 16b having longitudinal extent reduced as compared to like elements in the symmetrical twist axis case of known louvered connectors, the radial depth of the housing recess seating the strip member may be lessened, giving rise to reduced manufacturing cost. Alternatively, for the same radial recess depth as in known louvered connectors, strip members of the invention are seated more deeply therein and hence are less susceptible to removal on manipulation of the pin member.

The asymmetry in contact finger parts may be attained and the foregoing advantages realized without need for displacing the entirety of expanse 16 outwardly of the strip member openings. Thus, contact finger parts 16a and 16b may comprise opposed end portions of such strip member expanse displaced outwardly of the strip member openings, with one such end portion being of greater longitudinal extent than the other. The strip member is then formed into cylindrical shape as discussed above, such that the radially interior end portions are of greater longitudinal extent than the radially exterior end portions. In the particularly preferred embodiment, however, the sum of the longitudinal extents of the respective opposed end portions of each contact finger equals the longitudinal extent of the strip member continuous expanse defining such contact finger.

Figure 4B:
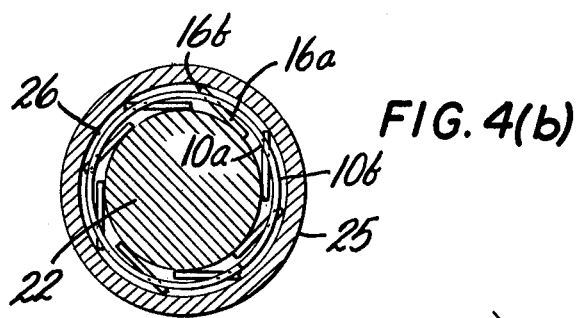
FIG. 4(b) is a sectional view of an alternative embodiment of a connector in accordance with the invention.

Referring now to the connector embodiment of FIG. 4(b), the contact fingers are formed by asymmetrical twisting but are disposed at an angle less than angle $\theta$ of FIG. 2, whereby contact finger parts 16a are in other than sharp contact edge engagement with pin member 22. That is, in the embodiment of FIG. 4(b), contact is achieved by resilient engagement between elongate flat surface 16e of each contact finger and the surface of the cylindrical pin member. Such FIG. 4(b) arrangement provides surface area contact between parts 16a and pin member 22 increased over that obtaining in endwise engagement, such as the sharp contact edge engagement described in FIG. 4(a) above. In accordance with another aspect of the invention, the contact finger extremities may be prepared as now discussed in connection with FIGS. 5, 6(a) and 6(b).

Figure 5:
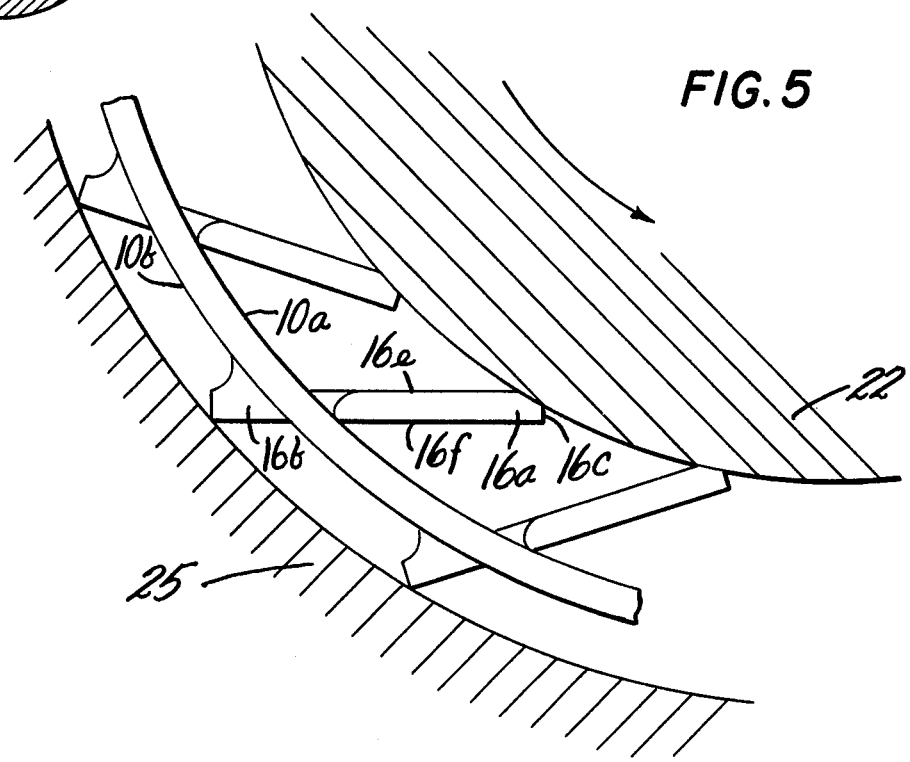
FIG. 5 is an enlarged partial sectional view of a further alternative embodiment of a connector in accordance with the invention showing radially inward contact finger parts in engagement with a complementary contact surface.
Figure 6A:
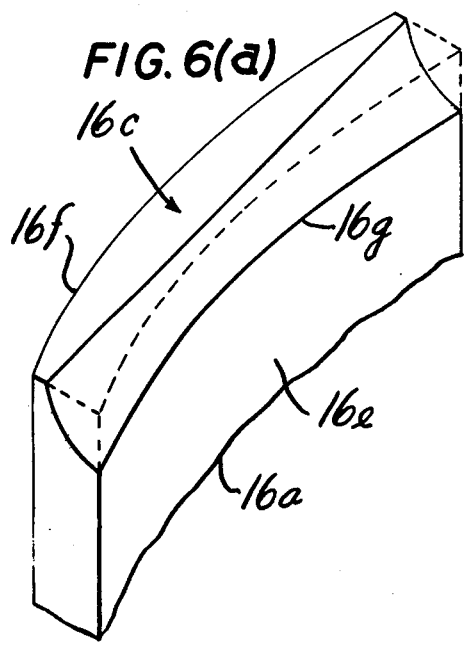
FIG. 6(a) illustrates the configuration of the FIG. 5 contact finger parts when resiliently flexed and FIG. 6(b) illustrates such configuration under non-flexed condition.
Figure 6B:
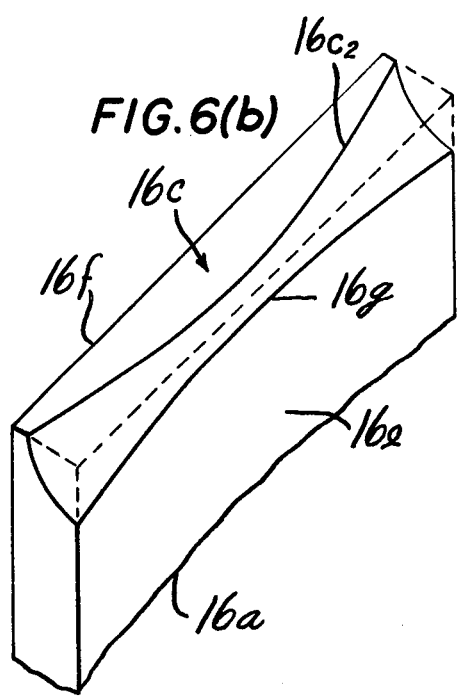

As shown in FIGS. 5 and 6(b), each contact finger part 16a includes opposed elongate flat surfaces 16e, 16f extending to the extremity 16c thereof displaced from strip member surface 10a. At extremity 16c, a curved surface portion 16g extends from at least one of surfaces 16e and 16f, for example, it extends from surface 16e as shown, toward the other surface 16f. At extremity 16c, a flat end surface is provided in a plane other than, and preferably in a plane orthogonal to, the planes of elongate flat surfaces 16e and 16f. Curved surface 16g intersects such extremity flat end surface over substantially the entire transverse extent of the extremity thereof, the intersection between curved surface 16g and the flat end surface defining a curved common boundary $16c_2$ for such flat end surface and curved surface $16g$. It will be noted that the curvature of such common boundary $16c_2$ occurs entirely within the plane defined by the flat end surface of extremity $16c$.

Such curved surface $16g$ may be located other than at extremity $16c$, e.g., in the case where contact is to be made as in FIG. 4(b) the surface $16g$ may be included as a portion of the elongate flat surface $16e$ at a position displaced from the flat end surface of extremity $16c$.

In forming surface $16g$, material is removed from extremity $16c$, when the finger is in its flexed condition as shown in FIG. 6(a), until the curved surface $16g$ is defined. The broken line outline in FIG. 6(a) indicates the original configuration of the finger prior to the removal of such material when the finger is in the flexed condition, whereas the broken line outline in FIG. 6(b) indicates the original configuration of the finger prior to the removal of such material and when the finger is in its unflexed condition.

Preferably, this material removal is effected by forming the strip member into contact element 20 as in FIGS. 1–4, seating the same in housing 25 and inserting a hone in the shape and size (particularly outer diameter) of pin member 22 into the contact element interior, thus causing the contact finger parts to flex into resilient engagement with the hone outer surface. Under such loading each contact finger part assumes the configuration shown in FIG. 6(a), i.e., slightly bowed or curved. The hone is then rotated to remove material confined in the volume of the broken lines. The results of such practice are shown in FIG. 6(a) which depicts the curved surface contour following such rotation of the hone and prior to removal of the same from the housing. As contact finger parts $16a$ return to their unflexed condition upon removal of the hone, they assume the configuration shown in FIG. 6(b). Upon subsequent insertion of a pin member into the housing, increased contact surface area exists between the cylindrical outer surface of the pin member and the complementary curved surface $16g$ of the honed contact finger parts $16a$, as shown in FIG. 5.

By way of example of a preferred method of fabricating a connector having honed louvers, a strip member comprised of beryllium copper alloy 25 of width 0.687 in. and length 1.078 in. is stamped to provide eleven cutouts or openings of the type shown in FIG. 1, the dimensions in FIGS. 1 and 2 being: $r = 0.031$ in.; $l_1 = 0.018$ in.; $l_2 = 0.049$ in.; $l_3 = 0.098$ in.; $l_4 = 0.355$ in.; $h_1 = 0.049$ in.; $h_2 = 0.069$ in.; and $\theta = 55°$. The strip member is formed into a cylindrically shaped female contact element with the inner strip member diameter being 0.438 in. The contact element is next seated in a cylindrical holder of inner diameter 0.381 in. and a cylindrical diamond hone of outer diameter 0.310 in., grit 300, is inserted in the contact element interior and is rotated through four complete revolutions in the direction of inclination of the radially interior contact finger parts.

Figure 7:
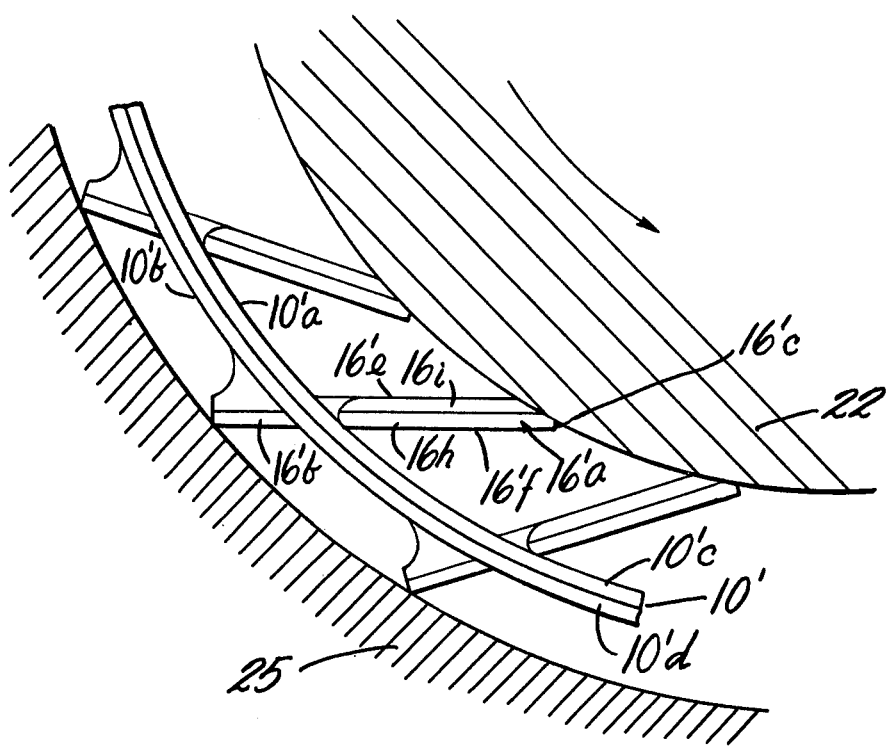
FIG. 7 is an enlarged partial elevational view of a still further embodiment of a connector in accordance with the invention.

Referring to FIG. 7, there is shown a further embodiment of the invention wherein strip member $10'$ is a laminated structure including layer $10'c$ comprised of material, e.g., copper, having relatively low electrical resistance and layer $10'd$ comprised of material, e.g., beryllium, having a relatively high unit resilience. Contact finger parts $16'a$ accordingly include a first low electrical resistance layer $16h$ and a second layer $16i$ of high resilience acting as a spring member resiliently engaging pin member 22. Where extremity $16'c$ is honed as above discussed, a surface is defined by portions of each layer. As will be seen in FIG. 7, such surface and layer $16h$ provide a direct low resistance path from the pin member to housing 25.

Figure 8:
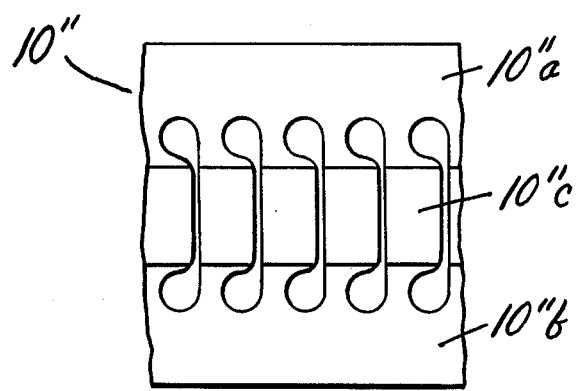
FIG. 8 is a plan view of a further embodiment of the strip member shown in FIG. 1.

In FIG. 8, strip member $10''$ includes marginal portions $10''a$ and $10''b$, each comprised of high unit resilience material as discussed above for layer $16i$, and a central portion $10''c$, comprised of low electrical resistance material as discussed above for layer $16h$. With this configuration, radially interior contact finger parts have margins functioning as springs and an intervening expanse providing a direct low resistance path from the pin member to the housing.

In instances wherein low connector electrical resistance is of particular concern, the invention contemplates the coating of the contact fingers with a substance of low resistance, e.g., as by plating or the like.

Various changes may evidently be introduced in the foregoing embodiments without departing from the spirit or scope of the invention. By way of example, the strip member is characterized as elongate in the direction of the spacing of openings therein only for purposes of clarity. While the foregoing embodiments all treat a female contact element having an interior hollow for receiving a complementary male contact element, the invention of course contemplates the placement of contact finger parts $16a$ in radially exterior disposition for engagement with a complementary contact element adapted to encircle such parts. Accordingly, the foregoing separately disclosed embodiments are intended in an illustrative and not in a limiting sense. The true spirit and scope of the invention is set forth in the following claims.

We claim:

1. A method for making a contact element of the type having resilient contact fingers engageable with a complementary contact element comprising the steps of:
   (a) forming transverse openings through opposed first and second flat surfaces of an elongate strip member; then
   (b) displacing outwardly of said strip member first surface an end portion of each strip member expanse between respectively adjacent transverse boundaries of successive of such openings; then
   (c) forming said strip member into a cylinder with said end portions of said expanses thereof extending interiorly of said cylinder; then
   (d) inserting into the interior of said cylinder a cylindrical hone of diameter greater than the diameter of the locus of the extremities of said end portions and equal to the diameter of said complementary contact element; and then
   (e) rotating said hone, thereby removing a part of each said end portion to define a curved surface at the extremity of each said end portion.

2. A method for making a contact element of the type having resilient contact fingers engageable with a complementary contact element comprising the steps of:
   (a) forming transverse openings through opposed first and second flat surfaces of an elongate strip member; then
   (b) displacing outwardly of said strip member second surface one end portion of each strip member expanse between respectively adjacent transverse boundaries of successive of such openings and displacing outwardly of said strip member first surface an opposed end portion of each said strip member expanse; then (c) forming said strip member into a cylinder with said opposed end portions of said expanses thereof extending interiorly of said cylinder; then (d) inserting into the interior of said cylinder a cylindrical hone of diameter greater than the diameter of the locus of the extremities of said opposed end portions and equal to the diameter of said complementary contact element; and then (e) rotating said hone, thereby removing a part of each said opposed end portion to define a curved surface at the extremity of each said opposed end portion.

3. A method for making a contact element of the type having resilient contact fingers engageable with a complementary contact element comprising the steps of:

(a) forming transverse openings through opposed first and second flat surfaces of an elongate strip member; then (b) displacing outwardly of said strip member second surface one end portion of each strip member expanse between respectively adjacent transverse boundaries of successive of such openings and displacing outwardly of said strip member first surface an opposed end portion of each said strip member expanse, said opposed end portion being of greater longitudinal extent than said one end portion; then (c) forming said strip member into a cylinder with said opposed end portions of said expanses thereof extending interiorly of said cylinder; then (d) inserting into the interior of said cylinder a cylindrical hone of diameter greater than the diameter of the locus of the extremities of said opposed end portions and equal to the diameter of said complementary contact element; and then (e) rotating said hone, thereby removing a part of each said opposed end portion to define a curved surface at the extremity of each said opposed end portion.

* * * * *

UNITED STATES PATENT AND TRADEMARK OFFICE
CERTIFICATE OF CORRECTION

PATENT NO. : 4,102,286
DATED : July 25, 1978
INVENTOR(S) : Glenn W. Johnson, Jr. and Paul F. Lindlau It is certified that error appears in the above-identified patent and that said Letters Patent are hereby corrected as shown below:

Column 1, line 22, change "2,217,473" to --2,217,433--.

Signed and Sealed this

Fifteenth Day of July 1980

[SEAL]

Attest:

SIDNEY A. DIAMOND

Attesting Officer     Commissioner of Patents and Trademarks